(12) United States Patent
Sung

(10) Patent No.: US 8,241,166 B2
(45) Date of Patent: Aug. 14, 2012

(54) POWER TRAIN FOR HYBRID VEHICLE

(75) Inventor: Duckhwan Sung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 12/627,509

(22) Filed: Nov. 30, 2009

(65) Prior Publication Data

US 2010/0273594 A1 Oct. 28, 2010

(30) Foreign Application Priority Data

Apr. 2, 2009 (KR) ........................ 10-2009-0028460

(51) Int. Cl.
*F16H 3/44* (2006.01)

(52) U.S. Cl. .......................................... 475/280; 475/5
(58) Field of Classification Search ............... 475/5, 280
See application file for complete search history.

(56) References Cited

U.S. PATENT DOCUMENTS 7,232,393 B2 * 6/2007 Bucknor et al. .................. 475/5

FOREIGN PATENT DOCUMENTS

| JP | 2004-345527 | 12/2004 |
| JP | 2006-077859 | 3/2006 |
| JP | 2008-114811 | 5/2008 |
| KR | 10-2008-0033700 | 4/2008 |

* cited by examiner

*Primary Examiner* — David D Le
*Assistant Examiner* — Derek D Knight
(74) *Attorney, Agent, or Firm* — Edwards Wildman Palmer LLP; Peter F. Corless

(57) ABSTRACT

The present invention provides a power train for a hybrid vehicle that allows for multiple mode driving, which is combined with a way of driving at a fixed gear ratio such as the shift stages of a common transmission, and high-efficiency driving, thereby improving fuel efficiency of the vehicle.

15 Claims, 15 Drawing Sheets

FIG.3

| MODE | CL1 | B1 | B2 |
|---|---|---|---|
| EV | | ● | |
| HEV | | | |
| FIRST FIXED GEAR | | | ● |
| SECOND FIXED GEAR | ● | | |
| REVERSE | | ● | |

POWER TRAIN FOR HYBRID VEHICLE

CROSS-REFERENCE TO RELATED APPLICATIONS

The present application claims priority to Korean Patent Application Number 10-2009-0028460 filed Apr. 2, 2009, the entire contents of which application is incorporated herein for all purposes by this reference.

BACKGROUND

1. Technical Field

The present disclosure relates to a power train for a hybrid vehicle, in more detail a power train structure for a hybrid vehicle that uses an engine, which is an internal combustion engine, as a power source providing driving force to a driving wheel and a motor generator driven by electricity.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

A power split type device has been known in the field of power trains for hybrid vehicles, which is classified into a single mode way and a two mode way. The single mode way does not need an operational element for shift control, such as a clutch or a brake, but the efficiency decreases in a high-velocity traveling, such that fuel efficiency is low and an additional torque amplifier is required to be applied to large-sized vehicles.

On the other hand, the two mode way can be designed to be able to ensure efficiency in high-velocity traveling and amplify torque by itself in accordance with the configuration, such that it can be applied to medium- and large-sized vehicles.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to a power train for a hybrid vehicle that allows for multiple mode driving, which is combined with a way of driving at a fixed gear ratio such as the shift stages of a common transmission, and high-efficiency driving, thereby improving fuel efficiency of the vehicle.

In an embodiment of the present invention, a power train for a hybrid vehicle includes a first planetary gear set, a second planetary gear set, an engine, a first motor generator, a second motor generator, an output element, a first brake, and a second brake. The first planetary gear set and the second planetary gear set include three rotary elements, respectively. Two of the rotary elements of the first planetary gear set are connected with two of the rotary elements of the second planetary gear set, thereby forming two pairs of connected rotary elements. The engine is connected to the first planetary gear set and the second planetary gear set. The first motor generator and the second motor generator are connected to the first planetary gear set and the second planetary gear set, respectively. The output element is connected to the second planetary gear set. The first brake is configured to restrain rotation of one of the two pairs of connected rotary elements and the second brake is configured to restrain rotation of one of the three rotary elements of the first planetary gear set. The clutch is configured to shift connecting state between at least one of the two pairs of connected rotary elements of the first planetary gear set and the second planetary gear set and the other rotary elements of the first planetary gear set and the second planetary gear set, such that all the rotary elements of the first planetary gear set and all the rotary elements of the second planetary gear set can be locked to each other and can integrally rotate, when the clutch is engaged.

In another embodiment, the second brake may be configured to restrain rotation of a rotary element, other than the rotary elements forming the two pairs of connected rotary elements.

According to the present invention, it is possible to allow for multiple mode driving, which is combined with a way of driving at a fixed gear ratio such as the shift stages of a common transmission, and high-efficiency driving, thereby improving fuel efficiency of the vehicle.

The above and other features and advantages of the present invention will be apparent from or are set forth in more detail in the accompanying drawings, which are incorporated in and form a part of this specification, and the following Detailed Description, which together serve to explain by way of example the principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 3 is an operational table of each operational mode of the power train for a hybrid vehicle shown in FIG. 1.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
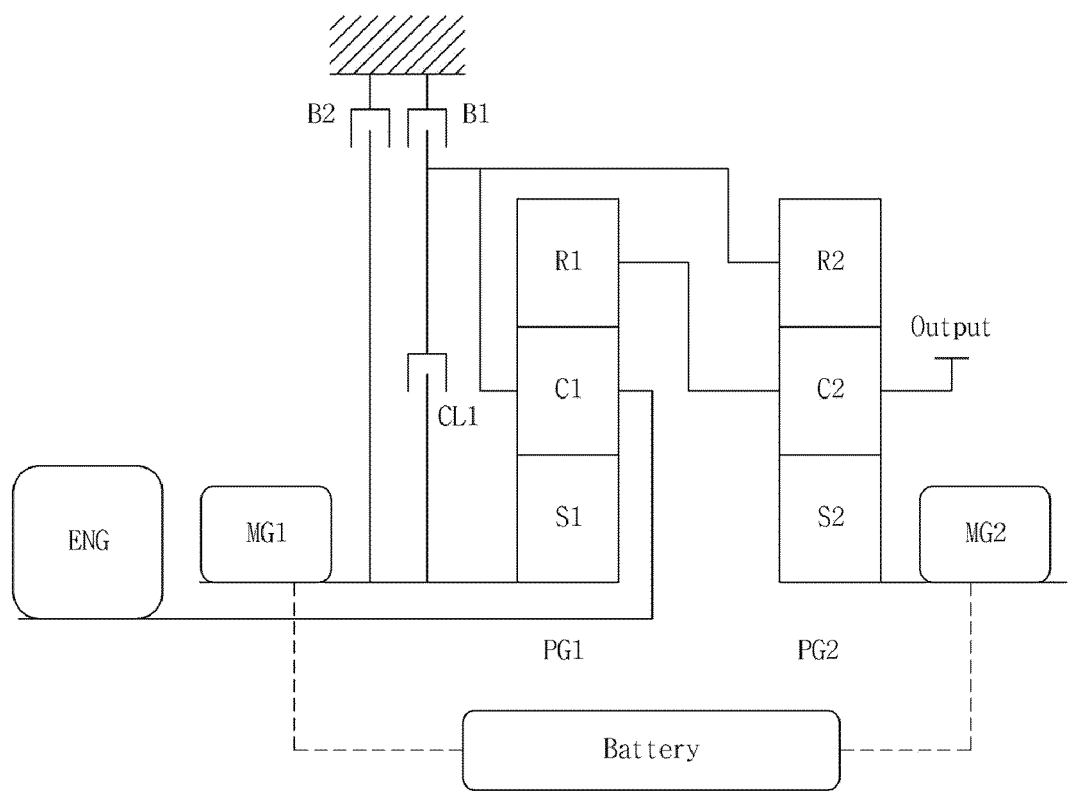
FIG. 1 is a diagram illustrating the configuration of an exemplary power train for a hybrid vehicle according to an embodiment of the present invention.
Figure 2:
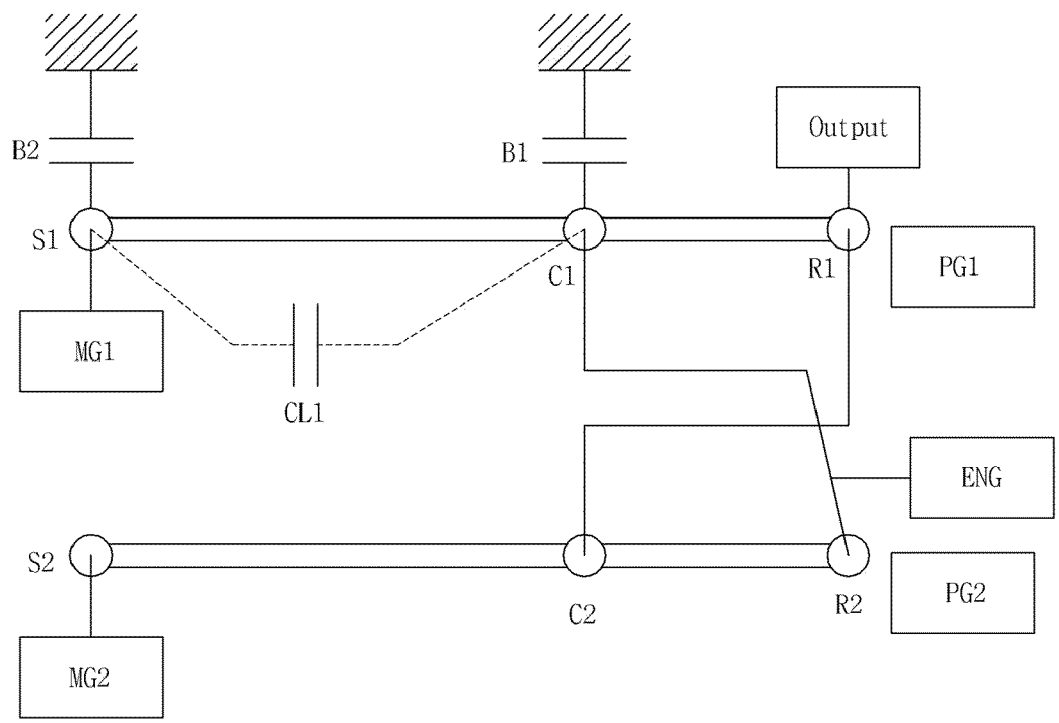
FIG. 2 is a lever diagram of the power train for a hybrid vehicle shown in FIG. 1.
Figure 2:
Figure 2:
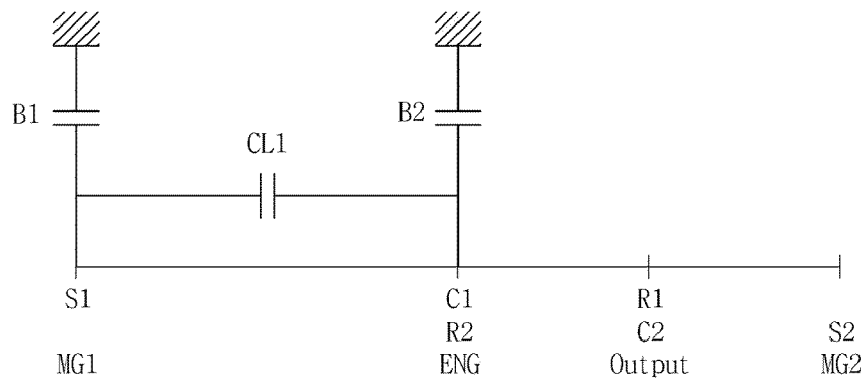

Referring to FIGS. 1 and 2, a power train for a hybrid vehicle in accordance with an embodiment of the present invention includes an engine ENG, a first motor generator MG1, an output element Output, a first planetary gear set PG1, a second planetary gear set PG2, a first brake B1, a second brake B2, and a clutch CL1.

The first planetary gear set PG1 and the second planetary gear set PG2 include three rotary elements, respectively. Two of the three rotary elements of the second planetary gear set PG2 are respectively connected with two of the three rotary elements of the first planetary gear set PG1. That is, there are two pairs of rotary elements that are always integrally connected with each other. The engine ENG is connected to the first planetary gear set PG1 and the second planetary gear set PG2. The first motor generator MG1 is connected to the first planetary gear set PG1 and the second motor generator MG2 is connected to the second planetary gear set PG2. The output element Output is connected to the second planetary gear set PG2. The first brake B1 is provided to be able to restrain rotation of any one of the two pairs of connected rotary elements of the first planetary gear set PG1 and the second planetary gear set PG2. The second brake B2 is provided to be able to restrain rotation of a rotary element of the first planetary gear set PG1. The clutch CL1 is configured to shift connecting state between at least one of the two pairs of connected rotary elements of the first planetary gear set PG1 and the second planetary gear set PG2 and the other rotary elements of the first planetary gear set PG1 and the second planetary gear set PG2, such that all the rotary elements of the first planetary gear set PG1 and all the rotary elements of the second planetary gear set PG2 can be locked to each other and can integrally rotate, when the clutch CL1 is engaged.

The engine ENG is connected to one of the two pairs of connected rotary elements, the output element Output is connected to the other of the two pairs of connected rotary elements, and the first motor generator MG1 is connected with the other rotary element, which is not connected with the engine ENG and the output element Output, of the first planetary gear set PG1.

The first brake B1 is provided to be able to restrain rotation of the pair of the two pairs that is connected with the engine ENG, and the second brake B2 is provided to be able to restrain rotation of the other rotary element of the first planetary gear set PG1 that is not connected with the rotary elements of the second planetary gear set PG2.

The clutch CL1 is disposed between the pair connected with the engine ENG and the rotary element, of which the rotation is restrained by the second brake B2, of the first planetary gear set PG1, and the second motor generator MG2 is connected to the rotary element, which is not connected with any of the rotary elements of the first planetary gear set PG1, of the second planetary gear set PG2.

For instance, a first sun gear S1 of the first planetary gear set PG1 is connected to the first motor generator MG1 and the second brake B2, a first carrier C1 of the first planetary gear set PG1 is connected to the engine ENG and the first brake B1 while being connected to a second ring gear R2 of the second planetary gear set PG2, a first ring gear R1 of the first planetary gear set PG1 is connected to a second carrier C2, which is connected to the output element Output, of the second planetary gear set PG2, a second sun gear S2 of the second planetary gear set PG2 is connected to the second motor generator MG2, and the clutch CL1 is disposed between the pair of rotary elements, which is composed of first carrier C1 and second ring gear R2, and the first sun gear S1.

In this configuration, the firs motor generator MG1 and the second motor generator MG2 are connected to a battery to be supplied with electric energy or supply electric energy for charging, and the output element Output is connected with the driving wheels of a vehicle through a differential device.

The power train in accordance with the embodiment can be operated in a plurality of modes including an electrical vehicle (EV) mode, a hybrid (HEV) mode, a First Fixed Gear mode, a Second Fixed Gear mode, and a Reverse mode, as shown in FIG. 3.

Each of the modes of the power train is described hereafter with reference to FIGS. 4 to 8.

Figure 4:
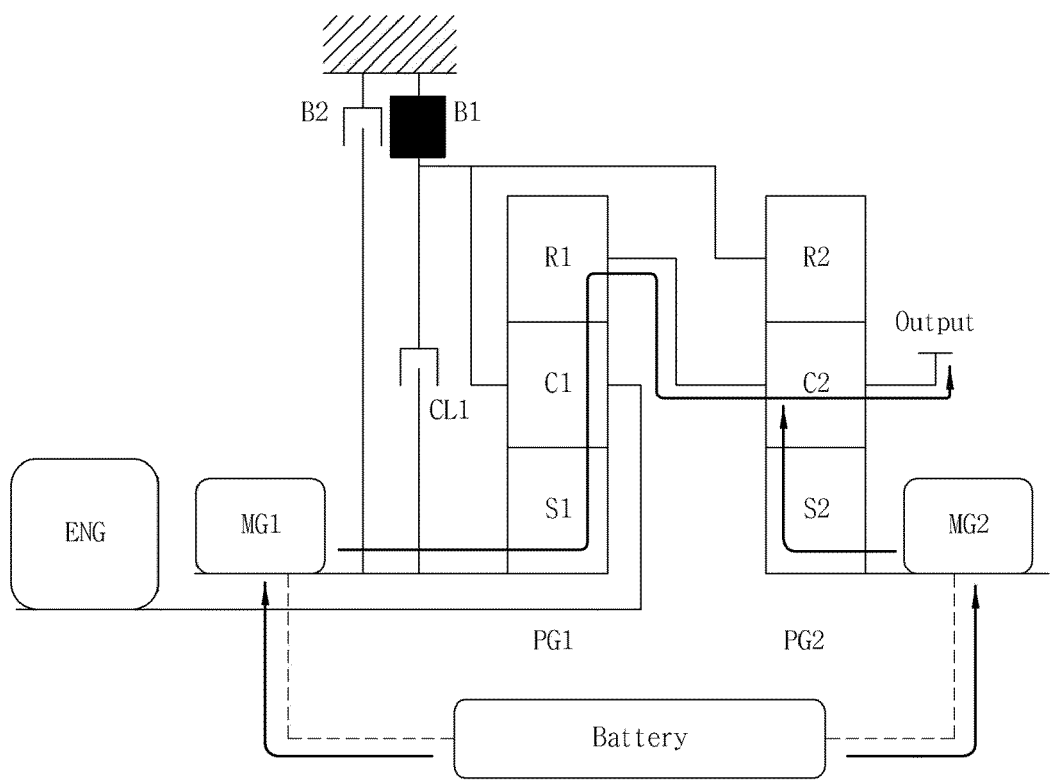
FIG. 4 is a diagram illustrating an EV mode of the power train for a hybrid vehicle shown in FIG. 1.
Figure 4:
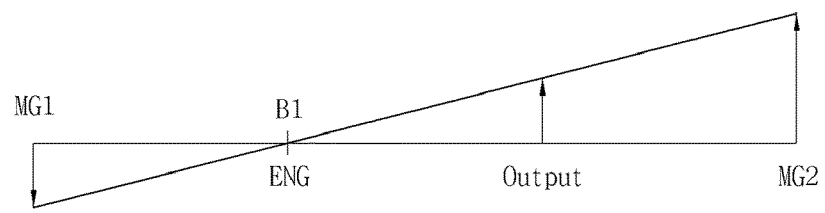

FIG. 4 illustrates the EV mode. In this mode, the first brake B1 is engaged and the first carrier C1, the second ring gear R2, and the engine ENG, which are connected to the first brake B1, are stopped. In this state, power generated by activating the first motor generator MG1 and the second motor generator MG2 is outputted to the output element Output through the first planetary gear set PG1 and the second planetary gear set PG2. Since the engine ENG is stopped in the EV mode as described above, exhaust gas is not discharged from the vehicle.

Figure 5:
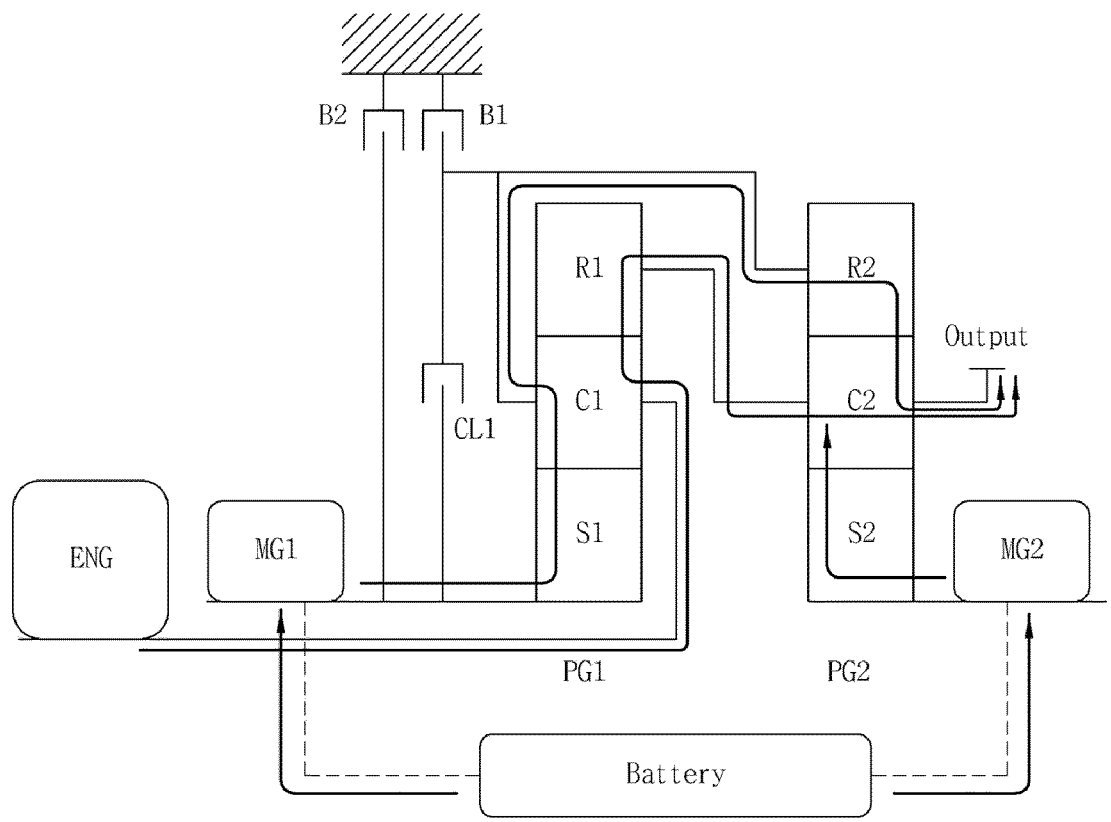
FIG. 5 is a diagram illustrating an HEV mode of the power train for a hybrid vehicle shown in FIG. 1.
Figure 5:
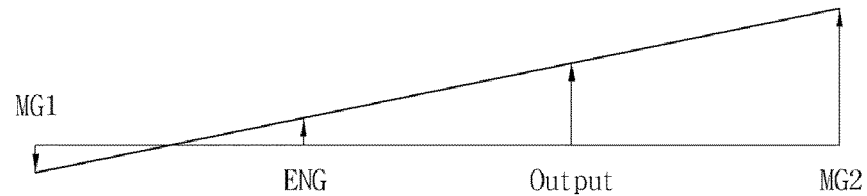

FIG. 5 illustrates the HEV mode. In this mode, the first brake B1 is disengaged and the engine ENG can be started. When the engine ENG is started, power from the engine ENG is transmitted to the first carrier C1 and the second ring gear R2. Accordingly, power from the engine ENG, the first motor generator MG1, and the second motor generator MG2 can be transmitted to the output element Output, such that hybrid driving state that makes it possible to drive the vehicle at all velocity ratios can be achieved only by controlling the power supply elements. According to this embodiment, the hybrid mode can be achieved without operating the clutch CL1 or brakes, which ensures that a vehicle can be driven in a hybrid mode even if the hydraulic system, clutch CL1, or the brakes malfunction during traveling.

Figure 6:
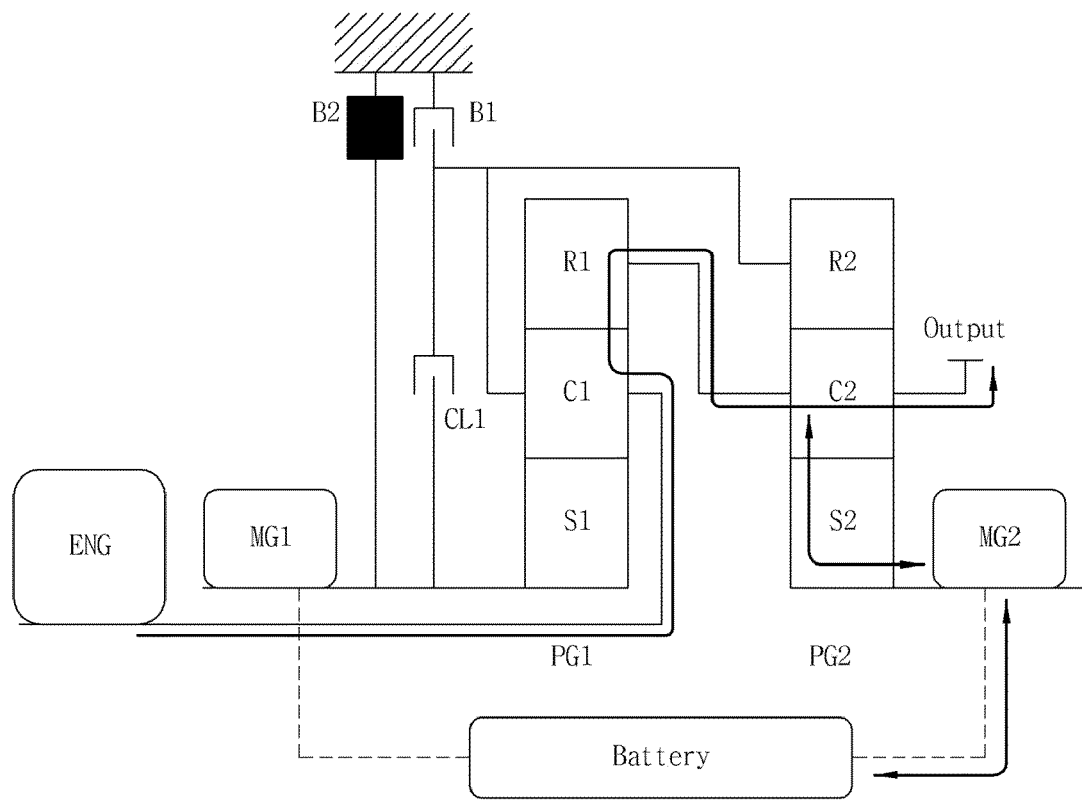
FIG. 6 is a diagram illustrating a First Fixed Gear mode of the power train for a hybrid vehicle shown in FIG. 1.
Figure 6:
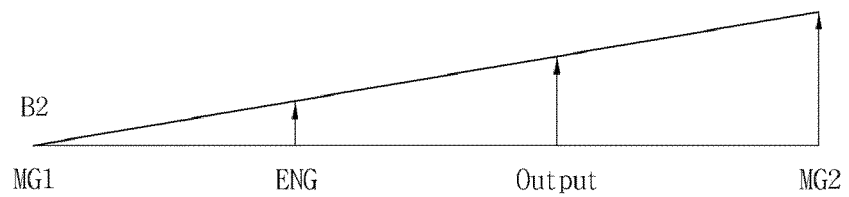

FIG. 6 illustrates a First Fixed Gear mode, which is achieved by stopping the first motor generator MG1 and engaging the second brake B2 in the HEV mode. As the second brake B2 is operated, the first motor generator MG1 and the first sun gear S1 are kept being stopped and power from the engine ENG is transmitted to the first carrier C1 and then outputted to the output element Output through the first ring gear R1 and the second carrier C2. In this operation, the second motor generator MG2 can be supplied with electricity from the battery and generate power, or can absorb a portion of the power from the engine ENG, which can be appropriately controlled by a control design based on, e.g., the charged state of the battery and the traveling stage of the vehicle, and which can drive the vehicle only by operating engine ENG. In this mode, power from the engine ENG is shifted to a predetermined shift ratio by the gear ratio of the first planetary gear set PG1 and the second planetary gear set PG2, and then outputted to the output element Output.

Figure 7:
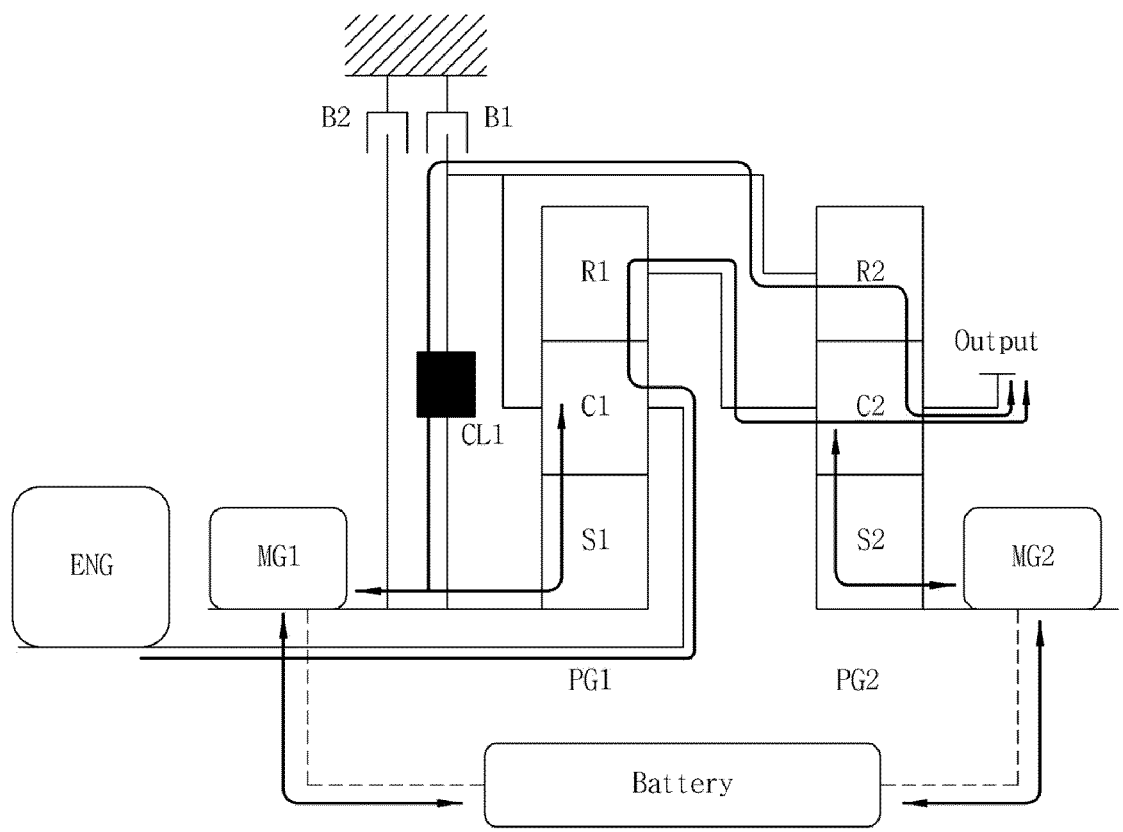
FIG. 7 is a diagram illustrating a Second Fixed Gear mode of the power train for a hybrid vehicle shown in FIG. 1.
Figure 7:
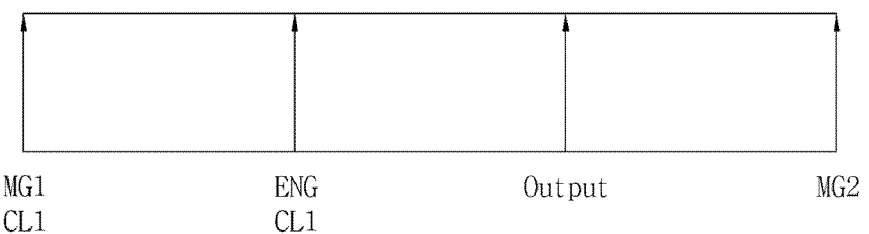

FIG. 7 illustrates a Second Fixed Gear mode, which can be achieved by engaging the CL 1. In this mode, with the CL 1 engaged, all the rotary elements of the first planetary gear set PG1 and the second planetary gear set PG2 have the same rotational velocity in the HEV mode. As a result, the first planetary gear set PG1 and the second planetary gear set PG2 rotate together at the same rotational velocity while all the rotary elements operate as one rotator. In this operation, power from the engine ENG is outputted to the output element Output through the first planetary gear set PG1 and the second planetary gear set PG2, and a velocity ratio of 1:1 is achieved. With this mode, the vehicle can be driven only by operating the engine ENG, or the first motor generator MG1 and the second motor generator MG2 can be used to either charge the battery or provide power to accelerate the vehicle, in which the first motor generator MG1 and the second motor generator MG2 can be appropriately controlled based on the information, for example, of the charged amount of the battery and the traveling state of the vehicle.

Figure 8:
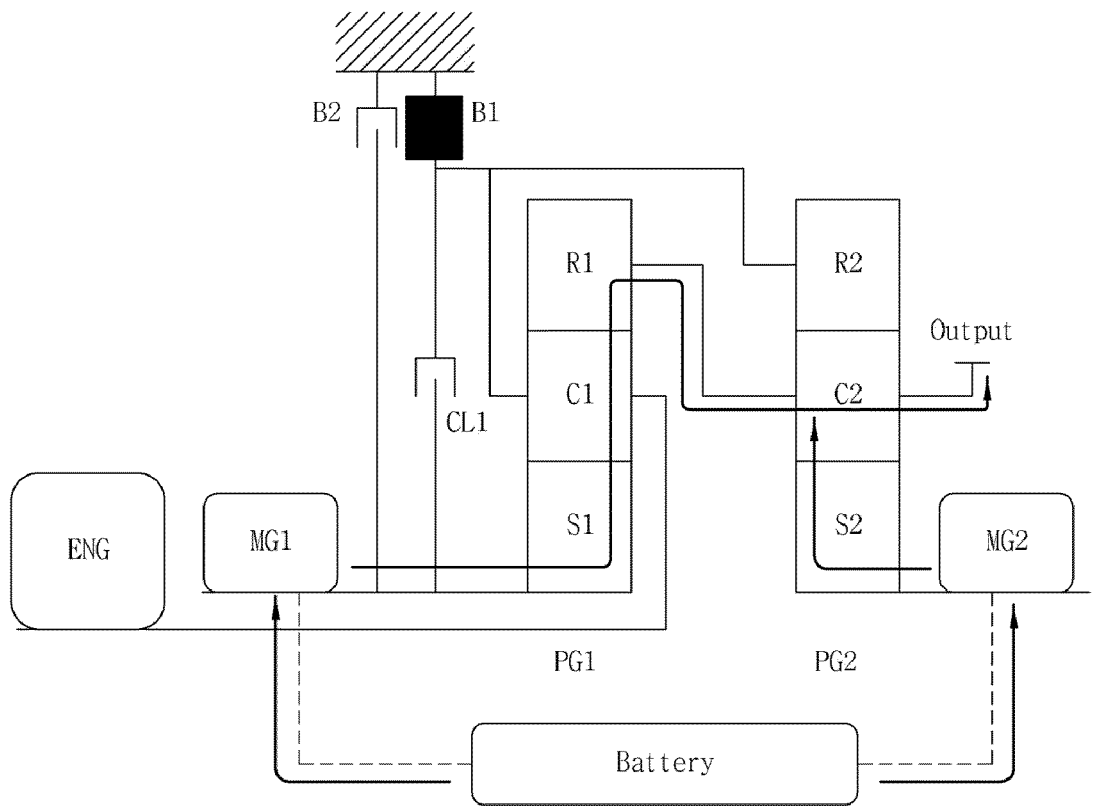
FIG. 8 is a diagram illustrating a Reverse mode of the power train for a hybrid vehicle shown in FIG. 1.
Figure 8:
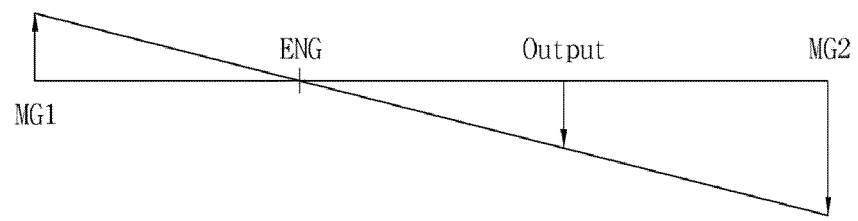

FIG. 8 illustrates a Reverse mode, in which only the first brake B1 is engaged, similar to the EV mode. That is, this mode can be achieved when the first motor generator MG1 and the second motor generator MG2 are operated in the reverse direction of the EV mode with the first carrier C1 and the second ring gear R2, which are connected with engine ENG, fixed by the first brake B1. In this mode, as the vehicle is driven only by the first motor generator MG1 and the second motor generator MG2 while the engine is stopped, exhaust gas is not discharged.

FIGS. 9 to 15 show additional embodiments of the present invention which are achieved by modifying the above embodiment.

Figure 9:
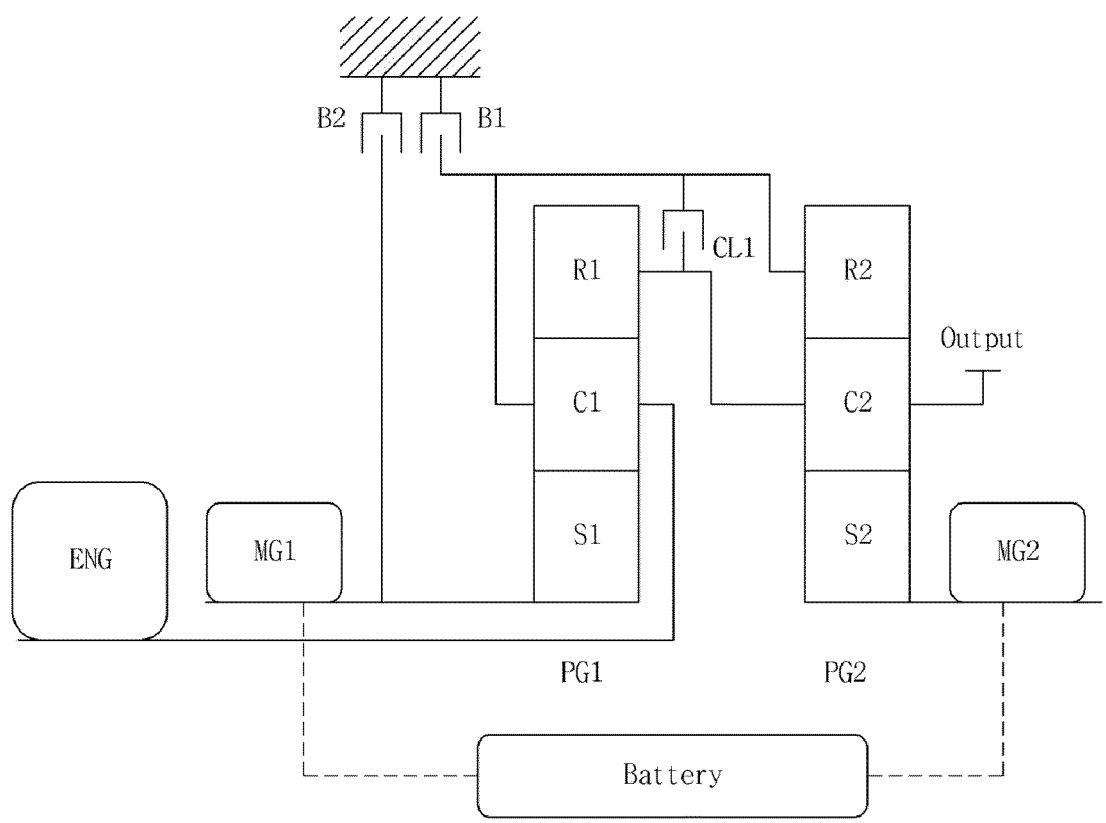
FIGS. 9 to 15 are diagrams illustrating other exemplary embodiments of the present invention.

In a second embodiment, as shown in FIG. 9, the clutch CL1 is disposed between the pair of rotary elements of the first carrier C1 and second ring gear R2 and the pair of rotary elements of the first ring gear R1 and the second carrier C2. Similarly, in this embodiment, as the clutch CL1 is engaged, all the rotary elements of the first planetary gear set PG1 and all the rotary elements of the second planetary gear set PG2 are locked to each other and integrally rotate, such that power from the engine ENG can be supplied at a shift ratio of 1:1 to the output element Output. Detailed description of the operation is omitted since it is identical or similar to as that of the first embodiment.

Figure 10:
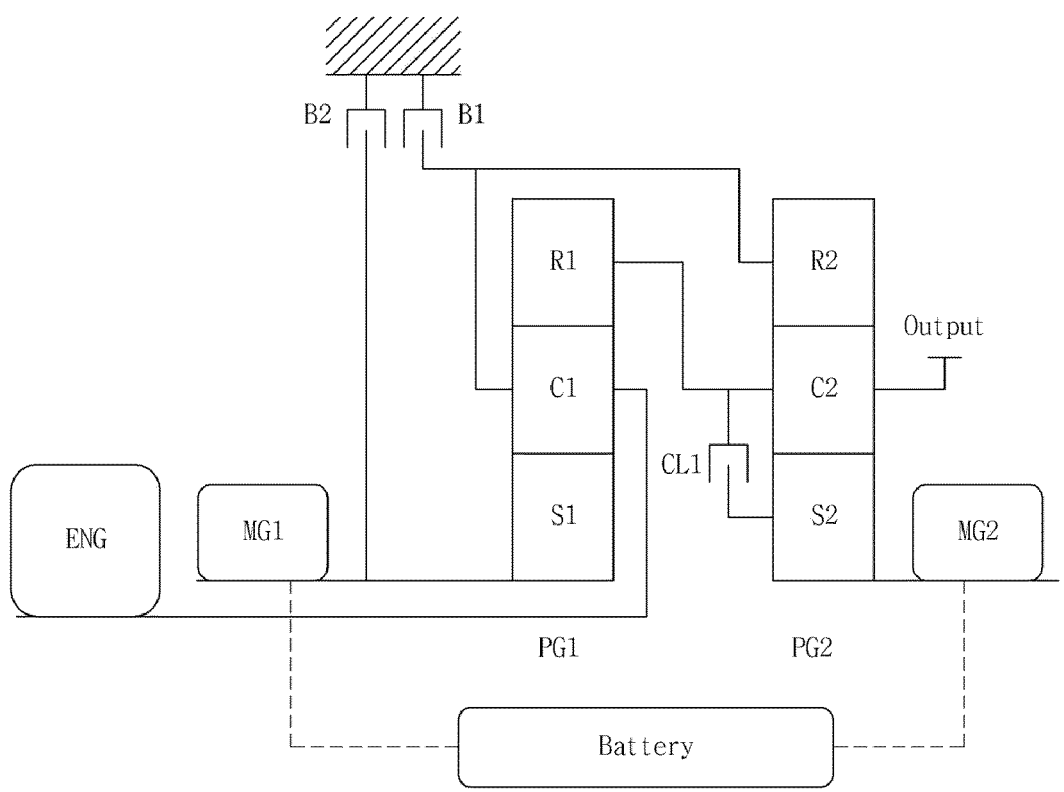

In a third embodiment, as shown in FIG. 10, the clutch CL 1 is disposed between the second sun gear S2 and the pair of rotary elements of the first ring gear R1 and the second carrier C2. Similarly, in this embodiment, as the clutch CL1 is engaged, all the rotary elements of the second planetary gear set PG2 are integrally locked to each other and all the rotary elements of the first planetary gear set PG1 are correspondingly locked to each other and integrally rotate, such that power from the engine ENG can be supplied at a shift ratio of 1:1 to the output element Output. Detailed description of the operation is omitted since it is identical or similar to as that of the first embodiment.

Figure 11:
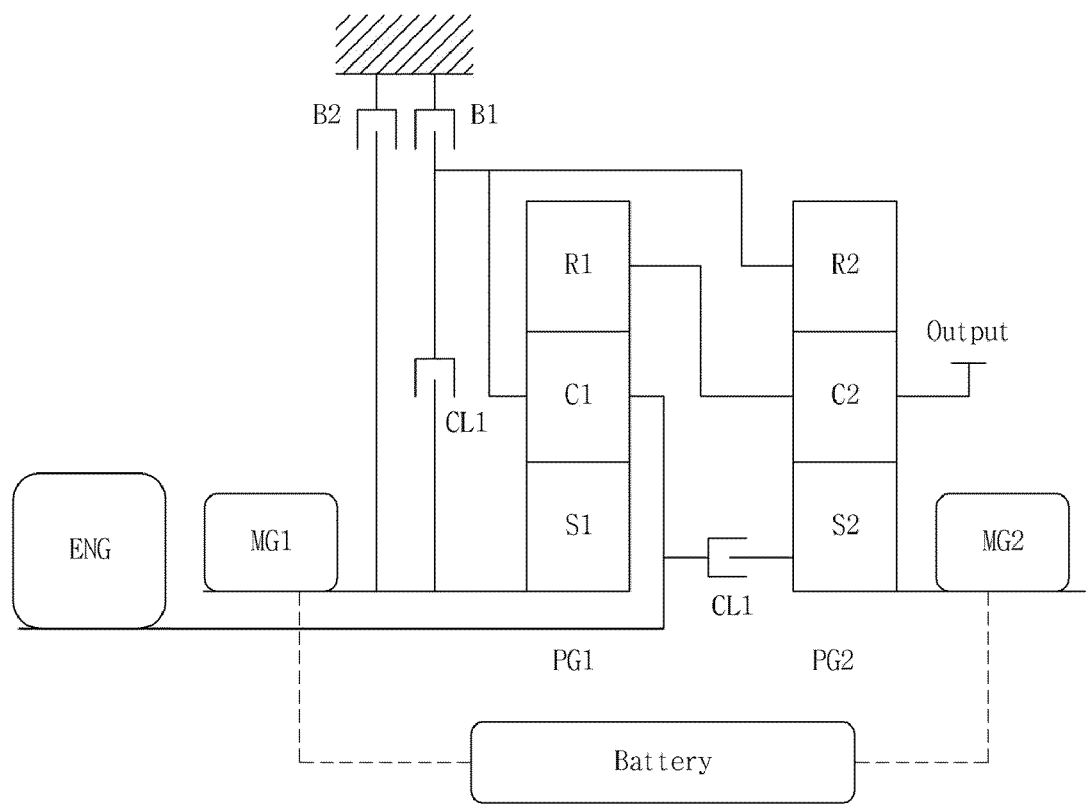

In a fourth embodiment, as shown in FIG. 11, the clutch CL1 is disposed between the second sun gear S2 and the pair of rotary elements of the first carrier C1 and the second ring gear R2. Similarly, in this embodiment, as the clutch CL1 is engaged, all the rotary elements of the second planetary gear PG2 set are integrally locked to each other and all the rotary elements of the first planetary gear set PG1 are correspondingly locked to each other and integrally rotate, such that power from the engine ENG can be supplied at a shift ratio of 1:1 to the output element Output. Detailed description of the operation is omitted.

FIGS. 12 to 15 shows embodiments in which the position of the second brake B2 is changed differently from the first embodiment. In the embodiments, the second brake B2 is disposed to able to restrain rotation of the second gear S2.

Figure 12:
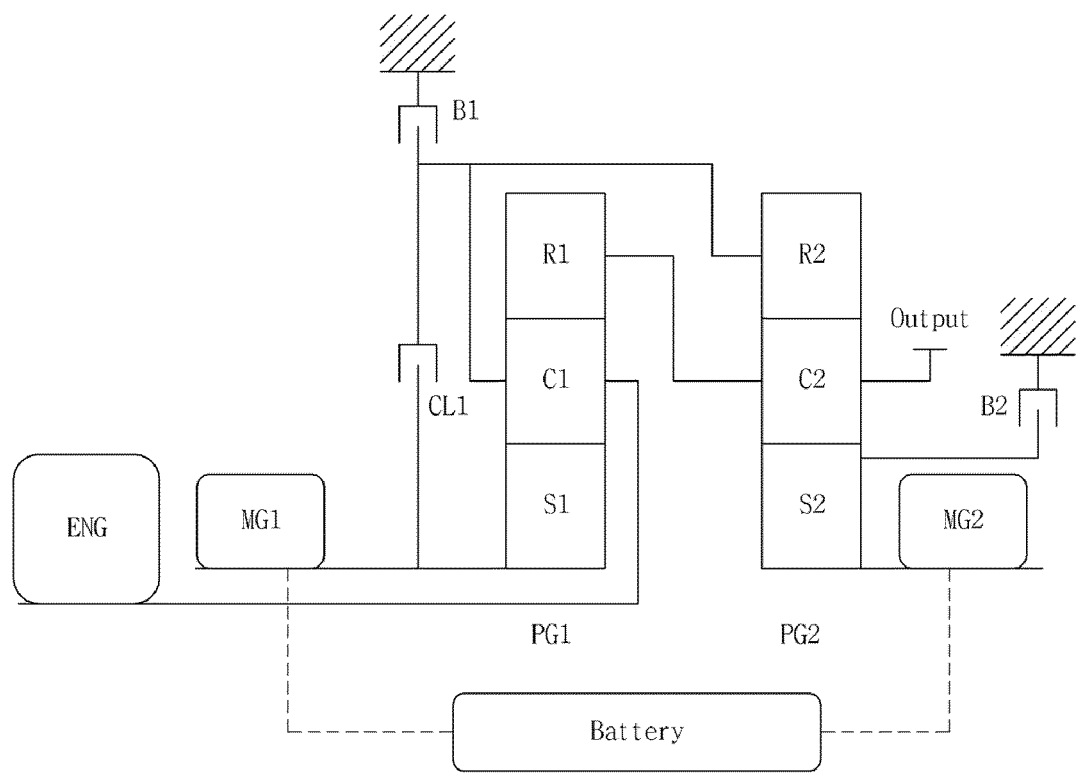

In a fifth embodiment, as shown in FIG. 12, the second brake B2 is disposed to be able to fix the second sun gear S2 and the clutch CL1 is disposed between the first sun gear S1 and the pair of rotary elements of the first carrier C1 and the second ring gear R2.

Figure 13:
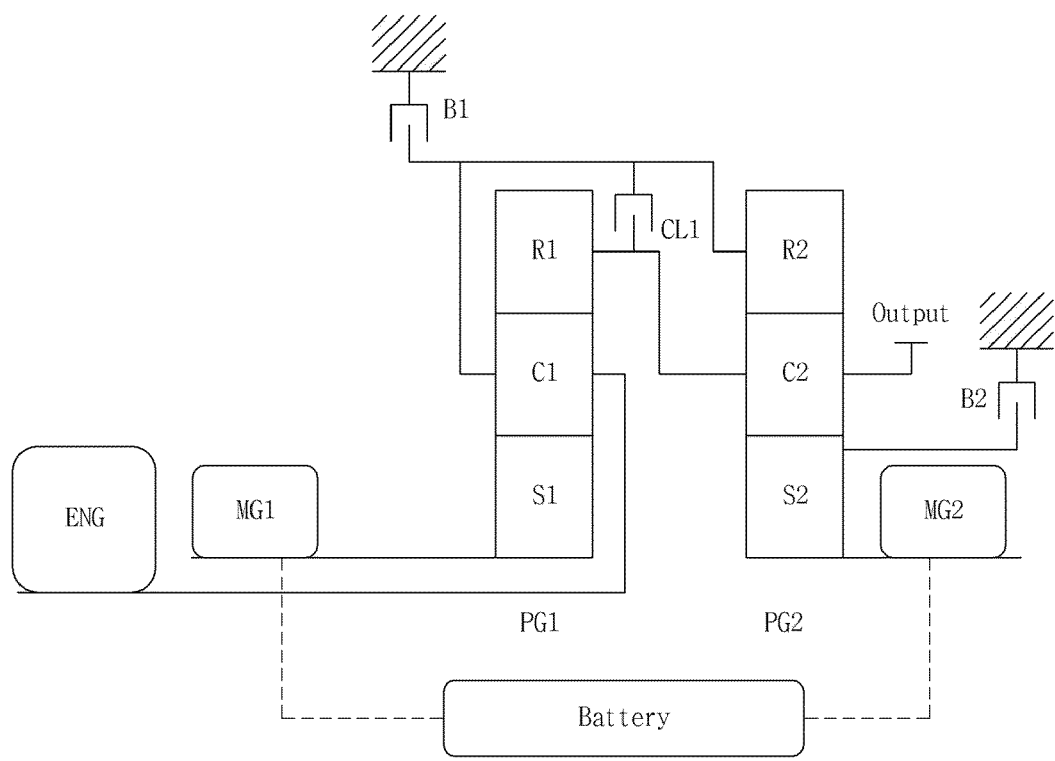

In a sixth embodiment, as shown in FIG. 13, the second brake B2 is disposed to be able to fix the second sun gear S2, the clutch CL1 is disposed between the pair of rotary elements of the first carrier C1 and the second ring gear R2 and the pair of rotary elements of the first ring gear R1 and the second carrier C2.

Figure 14:
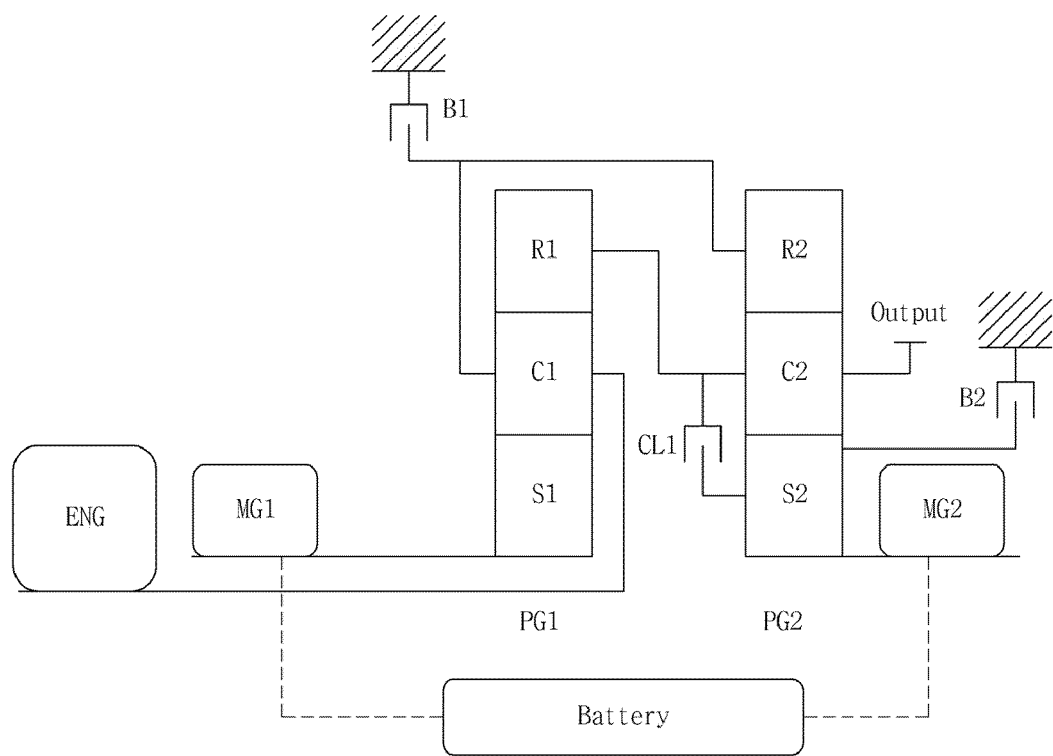

In a seventh embodiment, as shown in FIG. 14, the clutch CL1 is disposed between the second sun gear S2 and the pair of rotary elements of the first ring gear R1 and the second carrier C2.

Figure 15:
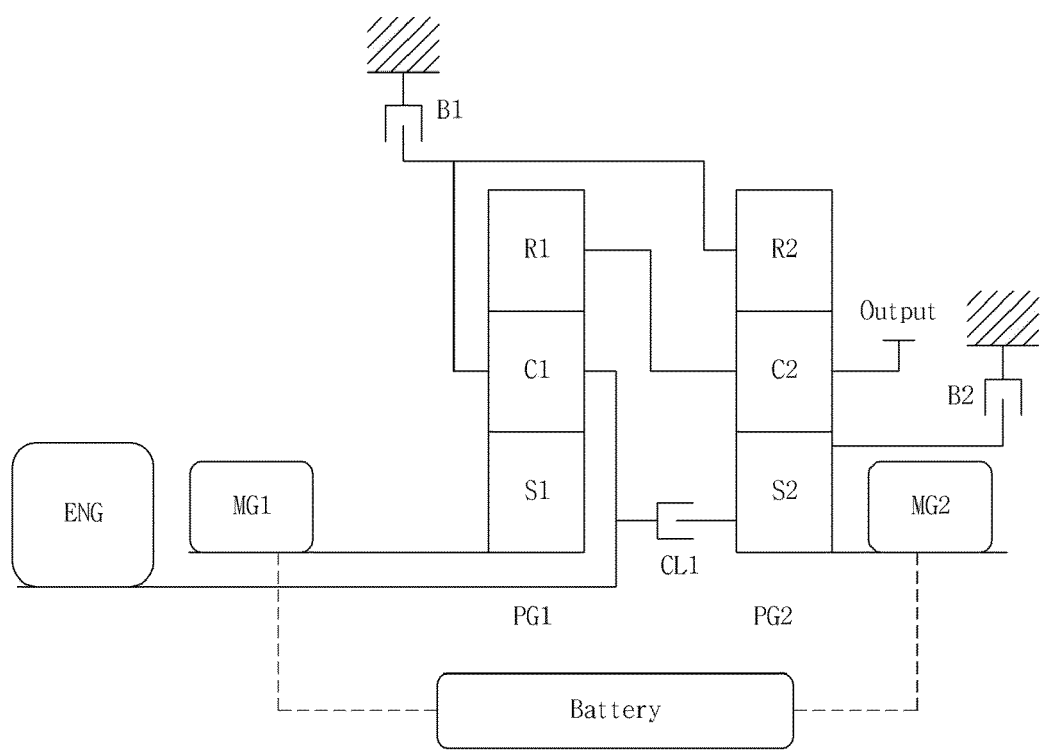

In a eighth embodiment, as shown in FIG. 15, the clutch CL1 is disposed between the second sun gear S2 and the pair of rotary elements of the first carrier C1 and the second ring gear R2.

In the power trains according to the fifth to eighth embodiments, the First Fixed Gear mode is suitably not used. Instead, the second motor generator MG2 and the second sun gear S2 are fixed by the engagement of the second brake B2, power generated by the engine ENG and the first motor generator MG1 is outputted to the output element Output through the first planetary gear set PG1 and the second planetary gear set PG2, in which the first motor generator MG1 can either generate (mechanical) power or generate electricity in accordance with the traveling state of the vehicle. Detailed description of the operation is omitted since it is identical or similar to as that of the above embodiment.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
   a first planetary gear set having three rotary elements;
   a second planetary gear set having three rotary elements, two of which elements are, respectively, connected with two of the three elements of the first planetary gear set so as to form two pairs of connected rotary elements;
   an engine that is connected to the first planetary gear set and the second planetary gear set;
   a first motor generator that is connected to the first planetary gear set;
   a second motor generator that is connected to the second planetary gear set;
   an output element that is connected to the second planetary gear set;
   a first brake that is configured to restrain rotation of one of the two pairs of connected rotary elements;

a second brake that is configured to restrain rotation of one of the three rotary elements of the first planetary gear set; and a clutch configured to shift connecting state between one of the two pairs of connected rotary elements of the first planetary gear set and the second planetary gear set and the other rotary elements of the first planetary gear set and the second planetary gear set, such that all the rotary elements of the first planetary gear set and all the rotary elements of the second planetary gear set can be locked to each other and can integrally rotate, when the clutch is engaged, wherein the engine is connected directly to one of the two pairs of connected rotary elements, and the output element is connected to the other pair, and the first motor generator is connected with the other rotary element, which is not connected with the engine and the output element, of the first planetary gear set, wherein the first brake is configured to restrain rotation of the pair that is connected with the engine, and the second brake is configured to restrain rotation of the other rotary element, which is not connected with the rotary elements of second planetary gear set, of the first planetary gear set, and wherein the clutch is disposed between the pair that is connected with the engine and the rotary element of the first planetary gear set, of which the rotation is restrained by second brake, and the second motor generator is connected to the other rotary element, which is not connected with the rotary elements of the first planetary gear set, of the second planetary gear set.

2. The power train for a hybrid vehicle as defined in claim 1, wherein a first sun gear of the first planetary gear set is connected to the first motor generator and the second brake, a first carrier of the first planetary gear set is connected to the engine and the first brake while being connected to a second ring gear of the second planetary gear set, a first ring gear of the first planetary gear set is connected a second carrier of the second planetary gear set, the second carrier being connected to the output element, a second sun gear of the second planetary gear set is connected to the second motor generator, and the clutch is disposed between the first sun gear and the pair formed by the first carrier and the second ring gear.

3. The power train for a hybrid vehicle as defined in claim 1, wherein the clutch is disposed between the two pairs of connected rotary elements, and the second motor generator is connected to the other rotary element, which is not connected with the rotary elements of the first planetary gear set, of the second planetary gear set.

4. The power train for a hybrid vehicle as defined in claim 3, wherein a first sun gear of the first planetary gear set is connected to the first motor generator and the second brake, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator, and the clutch is disposed between the pair formed by the first carrier and the second ring gear and the pair formed by the first ring gear and the second carrier.

5. The power train for a hybrid vehicle as defined in claim 1, wherein the clutch is disposed between the pair that is connected with the output element and the rotary element connected with the second motor generator, and the second motor generator is connected to the other rotary element, which is not connected with the rotary elements of the first planetary gear set, of the second planetary gear set.

6. The power train for a hybrid vehicle as defined in claim 5, wherein a first sun gear of the first planetary gear set is connected to the first motor generator and the second brake, a first carrier of the first planetary gear set is connected to the engine and the first brake while being connected to a second ring gear of the second planetary gear set, a first ring gear of the first planetary gear set is connected a second carrier of the second planetary gear set, the second carrier being connected to the output element, a second sun gear of the second planetary gear set is connected to the second motor generator, and the clutch is disposed between the second sun gear and the pair formed by the first ring gear and the second carrier.

7. The power train for a hybrid vehicle as defined in claim 1, wherein the clutch is disposed between the pair that is connected with the engine and the rotary element that is connected with the second motor generator, and the second motor generator is connected to the other rotary element, which is not connected with the rotary elements of the first planetary gear set, of the second planetary gear set.

8. The power train for a hybrid vehicle as defined in claim 7, wherein a first sun gear of the first planetary gear set is connected to the first motor generator and the second brake, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator, and the clutch is disposed between the second sun gear and the pair formed by the first carrier and the second ring gear.

9. A power train for a hybrid vehicle comprising:

a first planetary gear set having three rotary elements;

a second planetary gear having three rotary elements, two of which elements are, respectively, connected with two of the three elements of the first planetary gear set so as to form two pairs of connected rotary elements;

an engine that is connected to the first planetary gear set and the second planetary gear set;

a first motor generator that is connected to the first planetary gear set;

a second motor generator that is connected to the second planetary gear set;

an output element that is connected to the second planetary gear set;

a first brake that is configured to restrain rotation of one of the two pairs of connected rotary elements;

a second brake that is configured to restrain rotation of a rotary element, other than the rotary elements forming the two pairs of connected rotary elements wherein the second brake is disposed to restrain rotation of a rotary element of the second planetary gear set; and a clutch configured to shift connecting state between one of the two pairs of connected rotary elements of the first planetary gear set and the second planetary gear set and the other rotary elements of the first planetary gear set and the second planetary gear set, such that all the rotary elements of the first planetary gear set and all the rotary elements of the second planetary gear set can be locked to each other and can integrally rotate, when the clutch is engaged, wherein the engine is connected directly to one of the two pairs of connected rotary elements, and the output element is connected to the other pair, and the first motor generator is connected with the other rotary element, which is not connected with the engine and the output element, of the first planetary gear set, and wherein the first brake is configured to restrain rotation of the pair connected with the engine, and the second brake is configured to restrain rotation of the other rotary element, which is not connected with the rotary elements of first planetary gear set, of the second planetary gear set.

10. The power train for a hybrid vehicle as defined in claim 9, wherein the clutch is disposed between the pair that is connected with the engine and the rotary element of which the rotation is restrained by second brake, and the second motor generator is connected to the other rotary element, which is not connected with the rotary elements of the first planetary gear set, of the second planetary gear set.

11. The power train for a hybrid vehicle as defined in claim 10, wherein a first sun gear of the first planetary gear set is connected to the first motor generator, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator and the second brake, and the clutch is disposed between the first sun gear and the pair formed by the first carrier and the second ring gear.

12. The power train for a hybrid vehicle as defined in claim 10, wherein a first sun gear of the first planetary gear set is connected to the first motor generator, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator and the second brake, and the clutch is disposed between the pair formed by the first carrier and the second ring gear and the pair formed by the first ring gear and the second carrier.

13. The power train for a hybrid vehicle as defined in claim 10, wherein a first sun gear of the first planetary gear set is connected to the first motor generator, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator and the second brake, and the clutch is disposed between the second sun gear and the pair formed by the first ring gear and the second carrier.

14. The power train for a hybrid vehicle as defined in claim 10, wherein a first sun gear of the first planetary gear set is connected to the first motor generator, a first carrier of the first planetary gear set is connected to the engine and the first brake while being connected to a second ring gear of the second planetary gear set, a first ring gear of the first planetary gear set is connected to a second carrier of the second planetary gear set, the second carrier being connected to the output element, a second sun gear of the second planetary gear set is connected to the second motor generator and the second brake, and the clutch is disposed between the second sun gear and the pair formed by the first carrier and the second ring gear.

15. A power train for a hybrid vehicle comprising:

a first planetary gear set having three rotary elements;

a second planetary gear set having three rotary elements, two of which elements are, respectively, connected with two of the three elements of the first planetary gear set so as to form two pairs of connected rotary elements;

an engine that is connected to the first planetary gear set and the second planetary gear set;

a first motor generator that is connected to the first planetary gear set;

a second motor generator that is connected to the second planetary gear set;

an output element that is connected to the second planetary gear set;

a first brake that is configured to restrain rotation of one of the two pairs of connected rotary elements;

a second brake that is configured to restrain rotation of one of the three rotary elements of the first planetary gear set; and a clutch configured to shift connecting state between one of the two pairs of connected rotary elements of the first planetary gear set and the second planetary gear set and the other rotary elements of the first planetary gear set and the second planetary gear set, such that all the rotary elements of the first planetary gear set and all the rotary elements of the second planetary gear set can be locked to each other and can integrally rotate, when the clutch is engaged, wherein the engine is connected directly to one of the two pairs of connected rotary elements, and the output element is connected to the other pair.

* * * * *